(12) United States Patent
Pinardi

(10) Patent No.: US 9,782,924 B2
(45) Date of Patent: Oct. 10, 2017

(54) METHODS, ASSEMBLIES, AND SYSTEMS FOR HANDLING BLOW-MOLDED CONTAINERS

(71) Applicant: Graham Packaging Company, L.P., York, PA (US)

(72) Inventor: Gabriele Pinardi, Budrio (IT)

(73) Assignee: Graham Packaging Company, L.P., York, PA (US)

( * ) Notice: Subject to any disclaimer, the term of this patent is extended or adjusted under 35 U.S.C. 154(b) by 271 days.

(21) Appl. No.: 14/717,204

(22) Filed: May 20, 2015

(65) Prior Publication Data

US 2015/0336321 A1  Nov. 26, 2015

Related U.S. Application Data

(60) Provisional application No. 62/000,983, filed on May 20, 2014.

(51) Int. Cl.

| | |
|---|---|
| *B29C 49/42* | (2006.01) |
| *B29C 49/70* | (2006.01) |
| *B25J 15/00* | (2006.01) |
| *B25J 19/00* | (2006.01) |
| *B29C 49/04* | (2006.01) |
| *B29K 105/00* | (2006.01) |
| *B29K 101/12* | (2006.01) |
| *B29L 31/00* | (2006.01) |

(52) U.S. Cl.
CPC ......... *B29C 49/421* (2013.01); *B25J 15/0028* (2013.01); *B25J 19/00* (2013.01); *B29C 49/04* (2013.01); *B29C 49/4278* (2013.01); *B29C 49/70* (2013.01); *B29K 2101/12* (2013.01); *B29K 2105/258* (2013.01); *B29L 2031/7158* (2013.01)

(58) Field of Classification Search
CPC .............................. B29C 49/421; B29C 49/70
USPC .......................................................... 425/537
See application file for complete search history.

(56) References Cited

U.S. PATENT DOCUMENTS

| | | | | |
|---|---|---|---|---|
| 3,954,186 A | * | 5/1976 | Hafele | .................... B29C 49/70 414/729 |
| 4,886,443 A | * | 12/1989 | Klinedinst | ............ B29C 49/421 425/537 |

* cited by examiner

*Primary Examiner* — Robert B Davis
(74) *Attorney, Agent, or Firm* — Baker Botts L.L.P.

(57) ABSTRACT

Method to manufacture at least one container includes disposing at least one parison within a mold assembly having at least one mold chamber defined therein, wherein at least a first portion of the at least one parison extends outside the mold assembly and at least a second portion of the at least one parison is disposed within the at least one mold chamber. With the mold assembly closed, the second portion of the at least one parison can be blow-molded to form at least one container body. The first portion of the at least one parison can be gripped with a gripper when the mold assembly is opened, and a stabilization member can be extended proximate to the gripper to engage a surface of the at least one container body. Gripping assemblies and systems are also provided.

33 Claims, 17 Drawing Sheets

METHODS, ASSEMBLIES, AND SYSTEMS FOR HANDLING BLOW-MOLDED CONTAINERS

PRIORITY CLAIM

This application claims priority to U.S. Provisional Application Ser. No. 62/000,983, filed May 20, 2014, the contents of which is incorporated herein by reference in its entirety.

BACKGROUND

The methods, assemblies, and systems presented herein may be used for handling blow-molded containers, including plastic containers. The containers described herein can be formed from any material suitable for blow-molding including, but not limited to, plastics and other polymers. For example, the disclosed subject matter can be suited for handling blow-molded containers during transportation from a mold assembly to a trimming station. Using conventional techniques, containers can oscillate during transportation and thus can fall or continue to oscillate at the end of transportation. As such, additional waiting times can be required for the containers to stop oscillating before subsequent processing, such as trimming or the like.

SUMMARY

In accordance with an aspect of the disclosed subject matter, a method to manufacture at least one container is provided. At least one parison can be disposed within a mold assembly having at least one mold chamber defined therein, wherein at least a first portion of the at least one parison extends outside the mold assembly and at least a second portion of the at least one parison is disposed within the at least one mold chamber. The mold assembly can be closed. The second portion of the at least one parison can be blow-molded to form at least one container body. The first portion of the at least one parison can be gripped with a gripper. The mold assembly can be opened. A stabilization member can be extended proximate to the gripper to engage a surface of the at least one container body.

As embodied herein, the at least one container body can be moved with the gripper. Additionally or alternatively, a container socket can be closed on the at least one container body. The first portion of the at least one parison can be released from the gripper with the container socket closed on the at least one container body. The stabilization member can be retracted from the surface of the at least one container body with the container socket closed on the at least one container body. Additionally, scrap material can be trimmed from the at least one container body.

For purpose of illustration and not limitation, the stabilization member can be an L shaped member with an engagement leg. As embodied herein, the stabilization member is mounted to the gripper. Additionally or alternatively, a second stabilization member can engage a second surface of the at least one container body. In the same or different embodiment, extending can be performed by a drive cylinder.

In accordance with another aspect of the disclosed subject matter, a gripping assembly to support at least one container is provided. A gripper can be adapted to close on at least a first portion of at least one parison and open to release the first portion of the at least one parison. A stabilization member can be adapted to extend proximate the gripper to engage a surface of at least one container body formed by blow-molding at least a second portion of the at least one parison and to retract from engagement with the surface of the at least one container body.

As embodied herein, the stabilization members can be adapted to extend and retract by a drive assembly selected from a mechanical drive, hydraulic drive, or pneumatic drive. Additionally or alternatively, the gripping assembly can further include at least one column extending from the gripper. A carriage can be mounted on the at least one column, the carriage carrying the stabilization member. At least one drive cylinder can be connected to the carriage. The at least one drive cylinder can move the carriage along the column to thereby extend and retract the stabilization member. As embodied herein, an adjusting device can adjust a working stroke of the at least one drive cylinder. Additionally or alternatively, a valve block can prevent the stabilization member from extending if the at least one drive cylinder is not operational.

As embodied herein, a second stabilization member can be adapted to extend proximate the gripper to engage a second surface of the at least one container body and to retract from engagement with the second surface of the at least one container body. Additionally or alternatively, the stabilization member can be an L shaped member with an engagement leg.

In the same or a different embodiment, the gripper can include at least two gripper paddles. A first support can be connected to each gripper paddle. Connecting rods each can have a first connection point and a second connection point, and the first connection point can be connected to a respective first support. At least one second support can be connected to the second connection point of the connecting rods opposite the first supports. At least one third support can have a first end, a second end, and a track disposed between the first end and the second end. A wheel can be disposed in the track of the at least one third support and can move within the track. The wheel can be connected to the at least one second support member. At least one drive assembly can be selected from a mechanical drive, a hydraulic drive, or a pneumatic drive connected between the at least one second support member and the at least one third support member. The at least one drive assembly can move the at least one second support member to thereby open and close the gripper paddles.

In accordance with another aspect of the disclosed subject matter, a system to manufacture at least one container is provided. A mold assembly can have an open configuration and a closed configuration and at least one mold chamber defined therein. The mold assembly can receive at least one parison. At least a first portion of the parison can extend outside the mold assembly and at least a second portion of the parison can be disposed within the at least one mold chamber when the mold assembly is in the closed configuration. At least one gripping assembly can include a gripper that can close on the first portion of the at least one parison and open to release the first portion of the at least one parison. A stabilization member can extend proximate the gripper to engage a surface of at least one container body formed by blow-molding the second portion of the at least one parison and can retract from engagement with the surface of the at least one container body. A frame can connect the gripping assembly and the mold assembly.

As embodied herein, the stabilization members can be adapted to extend and retract by a drive assembly selected from a mechanical drive, a hydraulic drive, or a pneumatic drive. For purpose of illustration and not limitation, at least one column can extend from the gripper. A carriage can be mounted on the at least one column. The carriage can carry the stabilization member. Additionally, at least one drive cylinder can be connected to the carriage. The at least one drive cylinder can move the carriage along the column to thereby extend and retract the stabilization member. As embodied herein, an adjusting device can adjust a working stroke of the at least one drive cylinder. Additionally or alternatively, a valve block can prevent the stabilization member from extending if the at least one drive cylinder is not operational.

For purpose of illustration and not limitation, the stabilization member can be an L shaped member with an engagement leg. Additionally or alternatively, a second stabilization member can extend proximate the gripper to engage a second surface of the at least one container body and to retract from engagement with the second surface of the at least one container body.

As embodied herein, the gripper can include at least two gripper paddles. A first support can be connected to each gripper paddle. Connecting rods each can have a first connection point and a second connection point. The first connection point can be connected to a respective first support. At least one second support can be connected to the second connection point of the connecting rods opposite the first supports. At least one third support can have a first end, a second end, and a track disposed between the first end and the second end. A wheel can be disposed in the track of the at least one third support and can move within the track. The wheel can be connected to the at least one second support member. At least one drive assembly selected from a mechanical drive, a hydraulic drive, or a pneumatic drive can be connected between the at least one second support member and the at least one third support member. The at least one drive assembly can move the at least one second support member to thereby open and close the gripper paddles.

As embodied herein, at least one trimming station can be adjacent to the mold assembly. The trimming station can include a container socket adapted to receive the at least one container body. A trimmer can trim scrap material from the at least one container body. Additionally or alternatively, the gripping assembly can move the at least one container body from the mold assembly to the trimming station.

As embodied herein, a output gripper can transport the at least one container body from the trimming station. Additionally or alternatively, an extruder can extrude the at least one parison into the mold assembly.

DETAILED DESCRIPTION

In accordance with an aspect of the disclosed subject matter, a system to manufacture at least one container is provided. A mold assembly can have an open configuration and a closed configuration and at least one mold chamber defined therein. The mold assembly can receive at least one parison. At least a first portion of the parison can extend outside the mold assembly and at least a second portion of the parison can be disposed within the at least one mold chamber when the mold assembly is in the closed configuration. At least one gripping assembly can include a gripper that can close on the first portion of the at least one parison and open to release the first portion of the at least one parison. A stabilization member can extend proximate the gripper to engage a surface of at least one container body formed by blow-molding the second portion of the at least one parison and can retract from engagement with the surface of the at least one container body. A frame can connect the gripping assembly and the mold assembly.

In accordance with another aspect of the disclosed subject matter, a gripping assembly to support at least one container is provided. A gripper can be adapted to close on at least a first portion of at least one parison and open to release the first portion of the at least one parison. A stabilization member can be adapted to extend proximate the gripper to engage a surface of at least one container body formed by blow-molding at least a second portion of the at least one parison and to retract from engagement with the surface of the at least one container body.

In accordance with another aspect of the disclosed subject matter, a method to manufacture at least one container is provided. The method can be described in conjunction with the system. At least one parison can be disposed within a mold assembly having at least one mold chamber defined therein, wherein at least a first portion of the at least one parison extends outside the mold assembly and at least a second portion of the at least one parison is disposed within the at least one mold chamber. The mold assembly can be closed. The second portion of the at least one parison can be blow-molded to form at least one container body. The first portion of the at least one parison can be gripped with a gripper. The mold assembly can be opened. A stabilization member can be extended proximate to the gripper to engage a surface of the at least one container body.

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

Figure 16:
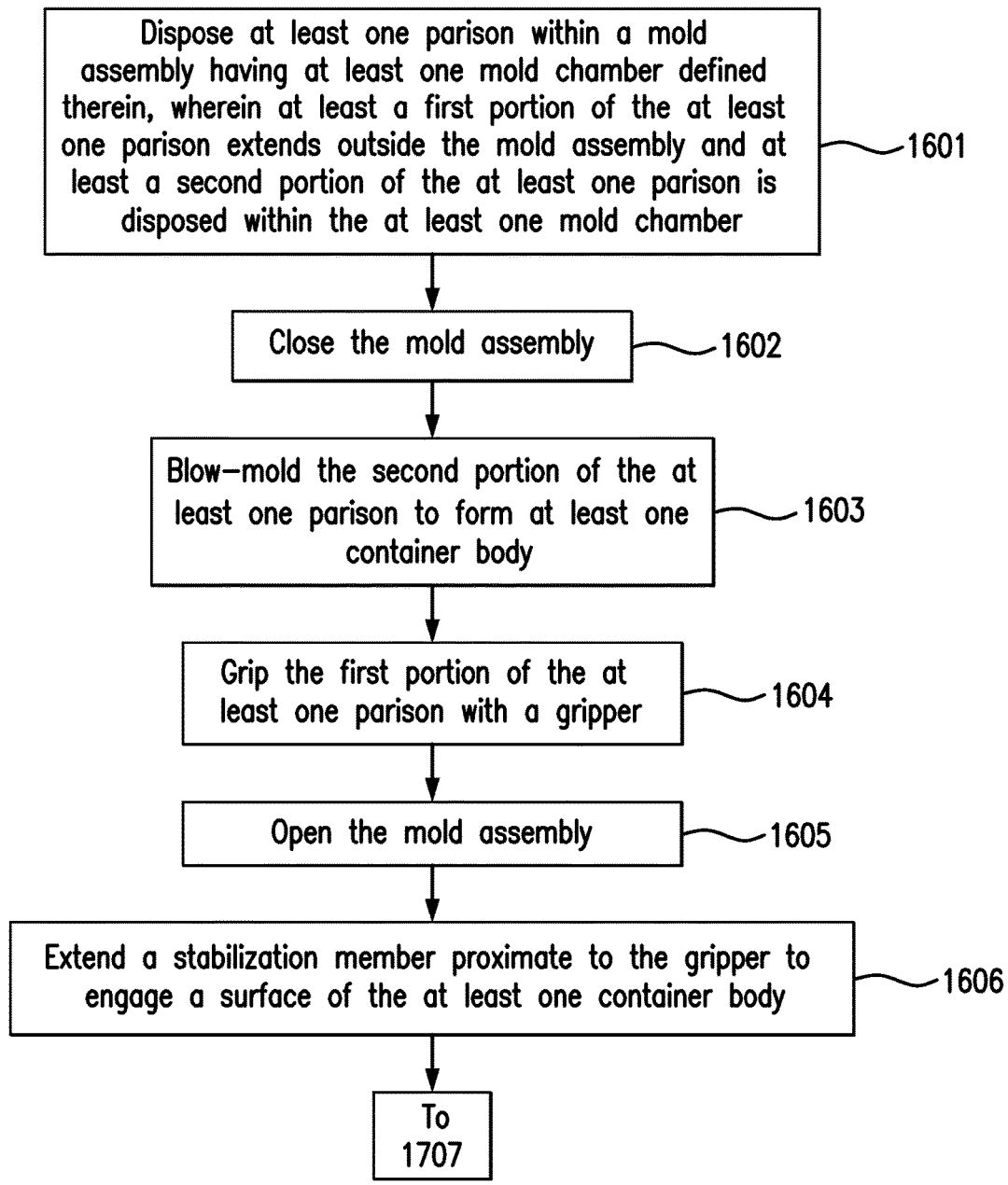
FIG. 16 is a flow chart of method to manufacture at least one container in accordance with the disclosed subject matter.
Figure 17:
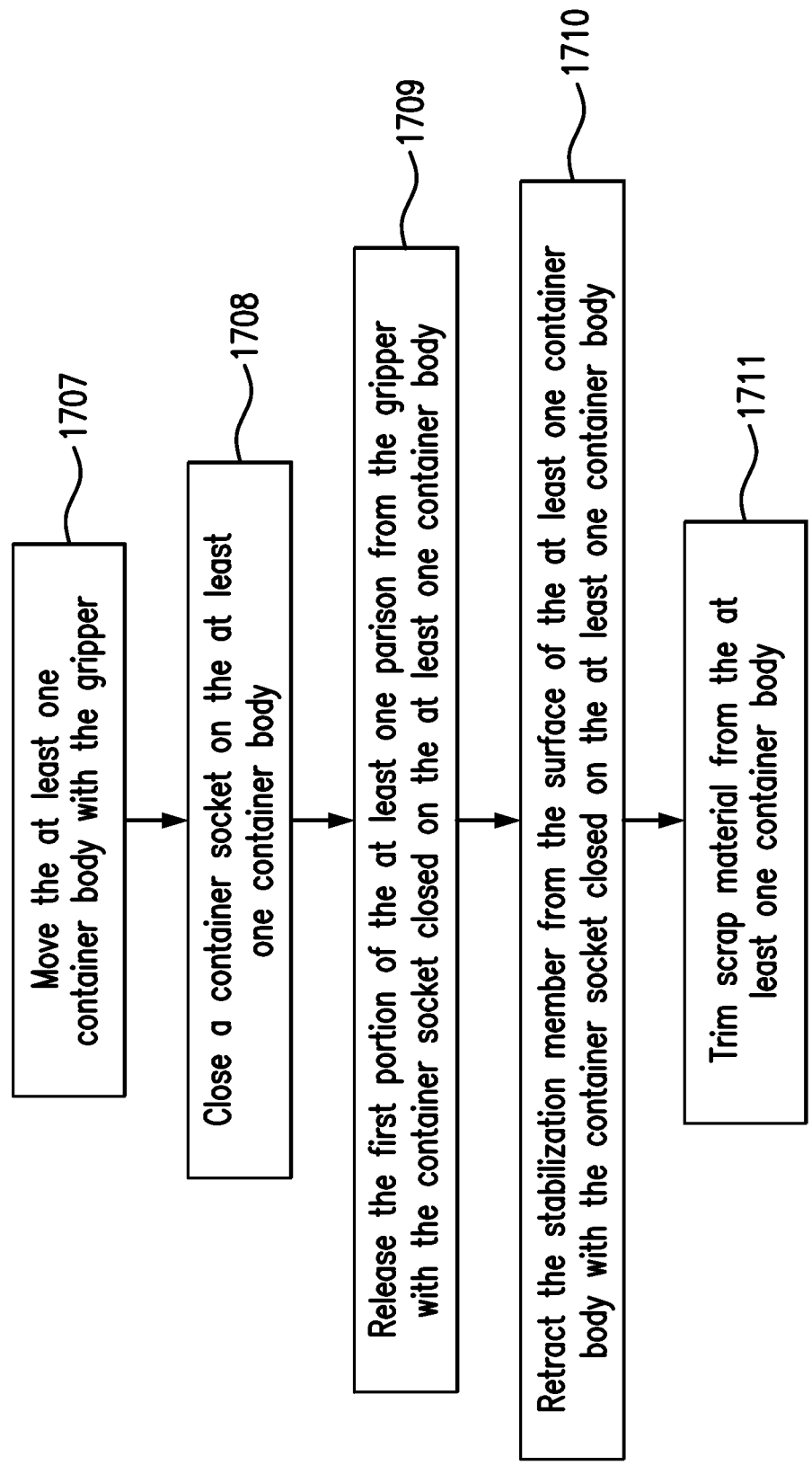
FIG. 17 is a flow chart of method to manufacture at least one container in accordance with the disclosed subject matter.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of the gripping assembly to support at least one container and system to manufacture at least one container in accordance with the disclosed subject matter are shown in FIGS. 1-15. Exemplary embodiments of method to manufacture at least one container in accordance with the disclosed subject matter are shown in FIGS. 16-17. The gripping assembly, system, and methods are suitable for use with a wide variety of containers. However, for purpose of understanding, reference can be made to a plastic container.

Figure 1:
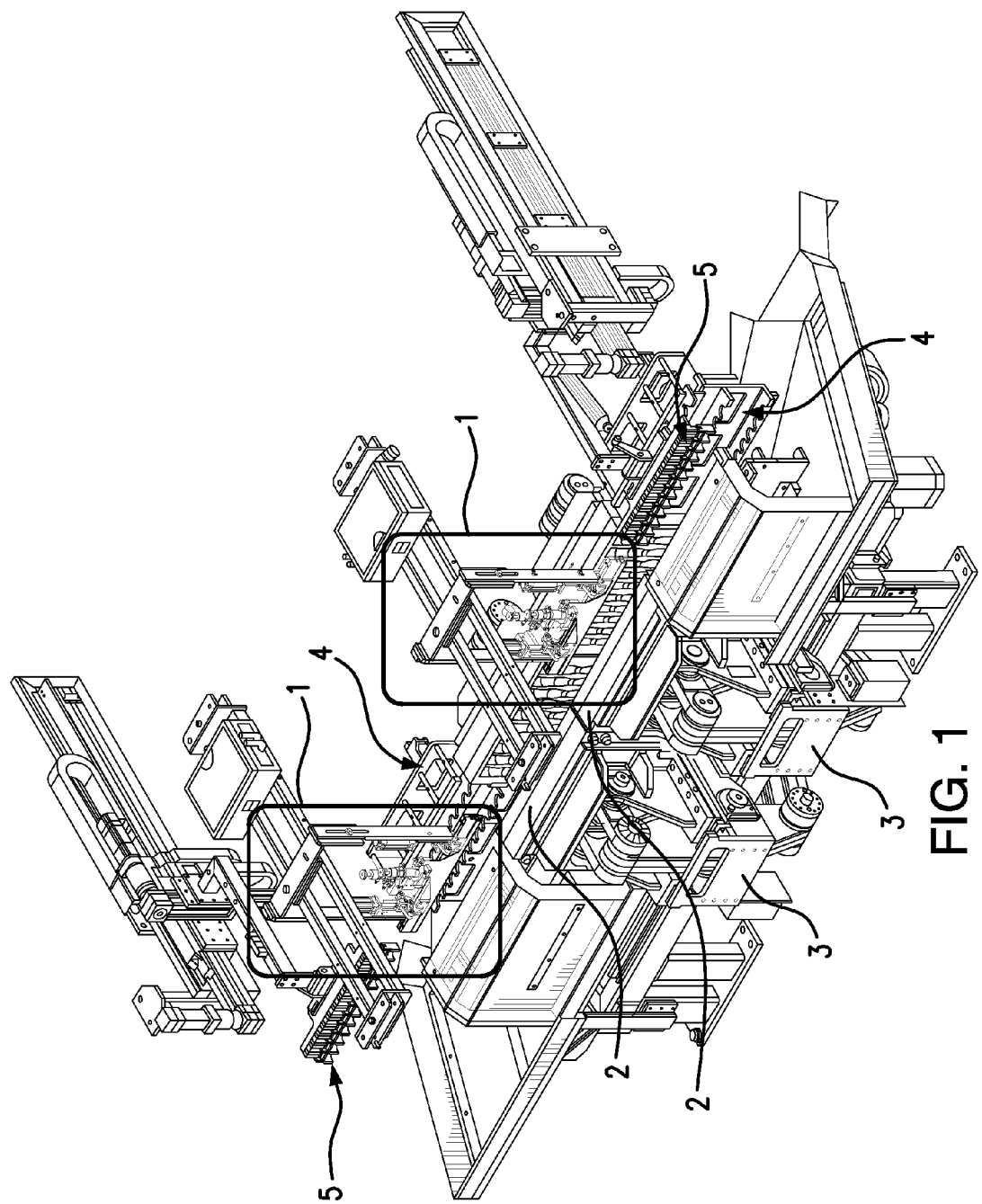
FIG. 1 is a schematic view of a system including at least one gripping assembly in accordance with the disclosed subject matter.
Figure 2:
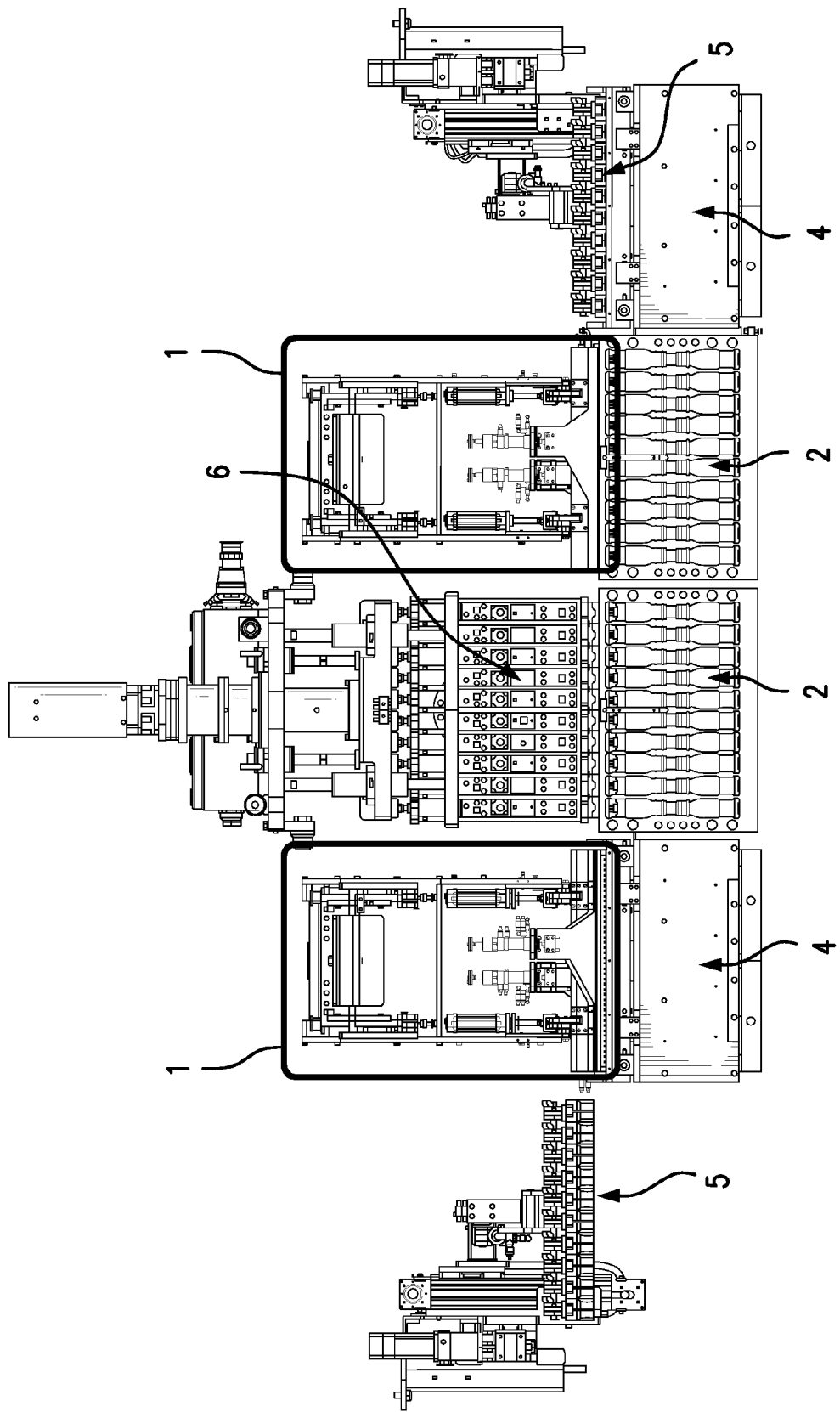
FIG. 2 is a schematic view of a system including at least one gripping assembly in accordance with the disclosed subject matter.
Figure 3:
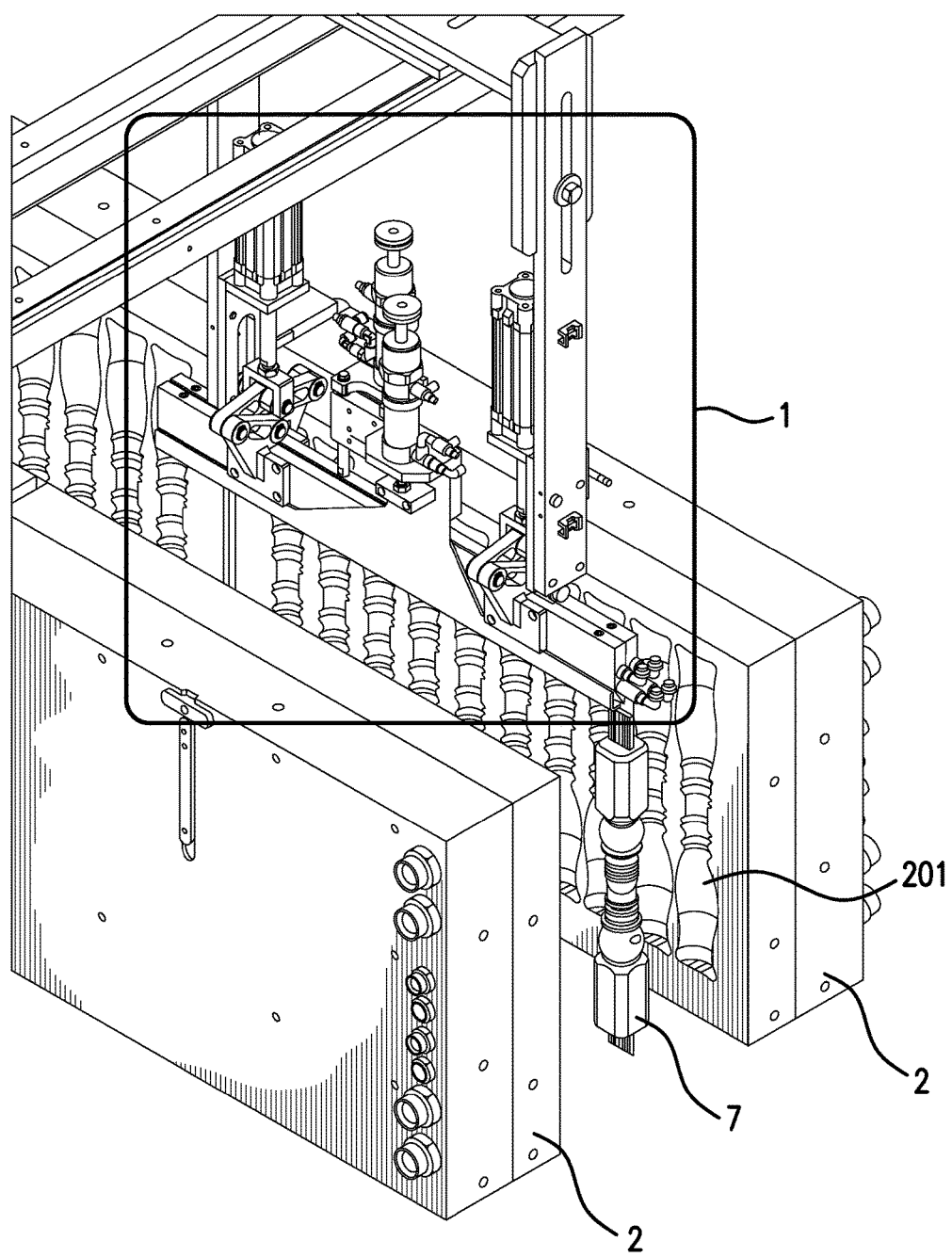
FIG. 3 is a schematic view of a portion of a system including at least one gripping assembly in accordance with the disclosed subject matter.
Figure 4:
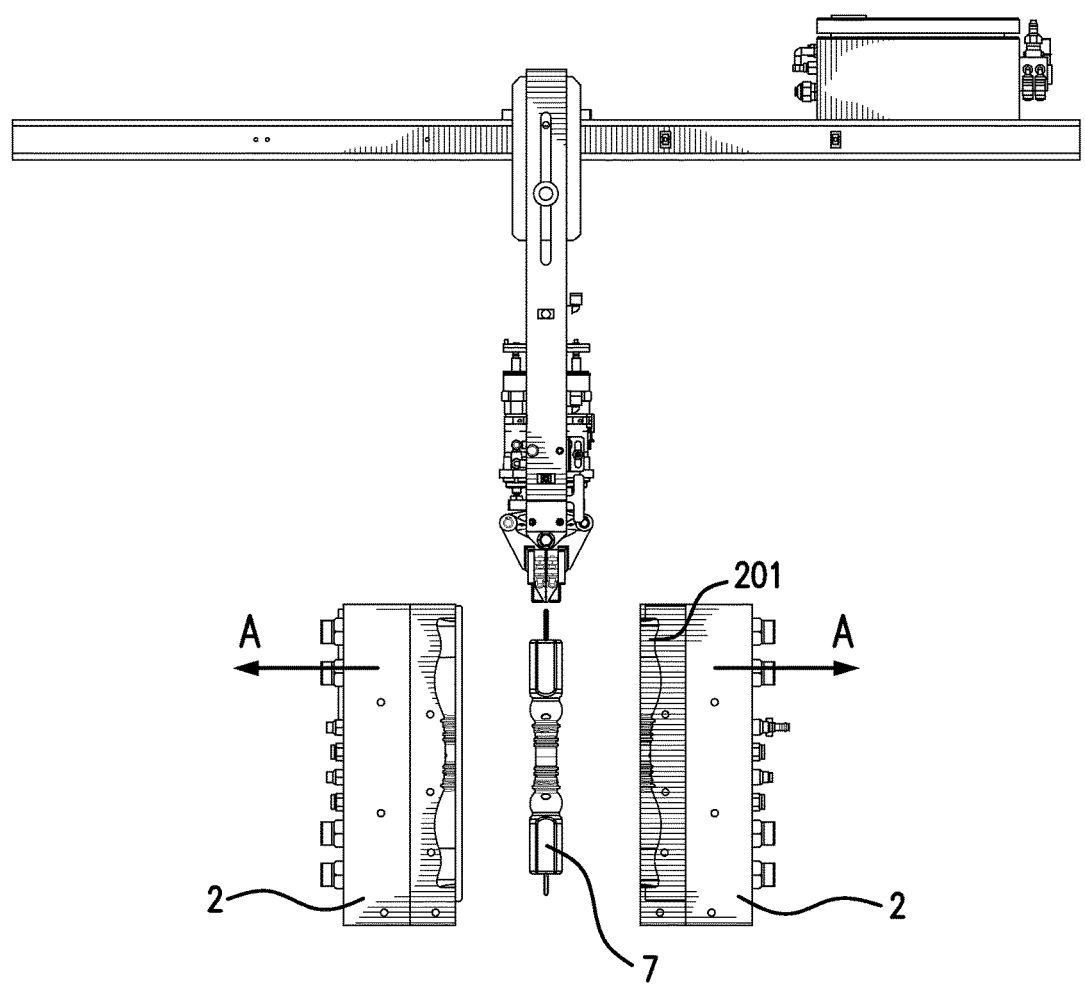
FIG. 4 is a schematic view of a portion of a system including at least one gripping assembly in accordance with the disclosed subject matter.
Figure 5:
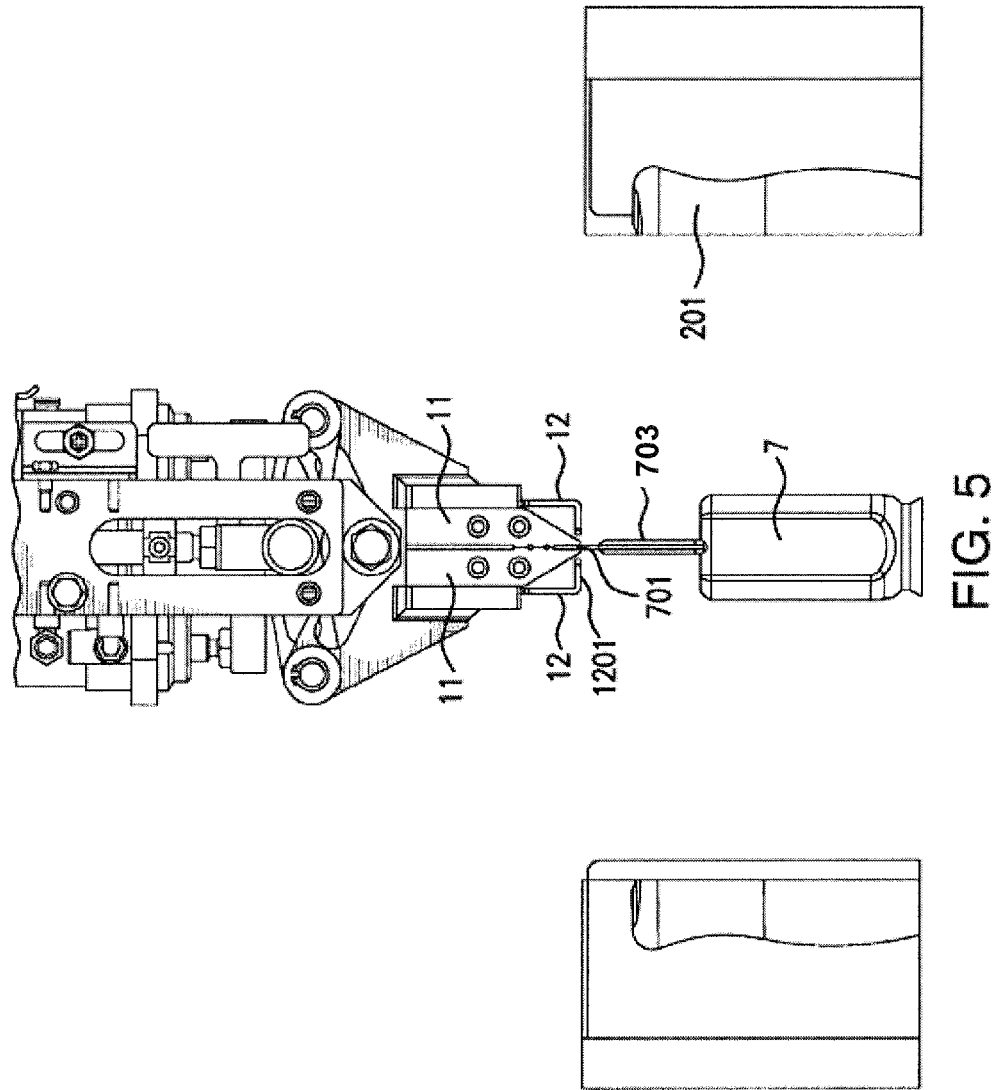
FIG. 5 is a schematic view of a portion of a system including at least one gripping assembly in accordance with the disclosed subject matter.

In the exemplary embodiment shown in FIGS. 1-15, a system to manufacture at least one container generally can include a gripping assembly 1 and at least one mold assembly 2. FIGS. 1-2 depicts two gripping assemblies and two mold assemblies 2, but the system can involve any suitable number of each as appropriate, including one of each or multiple of each. A mold assembly 2 can have an open configuration and a closed configuration. As embodied herein, the system can include a structure 3 to open and close the mold assembly 2. Additionally, the mold assembly 2 can have at least one mold chamber 201 defined therein. For purpose of illustration and not limitation, the mold assembly 2 can have a plurality of neck-to-neck container mold chambers 201, as shown in FIGS. 3-4. The mold assembly 2 can receive at least one parison. For example and not limitation, the number of parisons can correspond to the number of mold chambers in the mold assembly 2.

Figure 6:
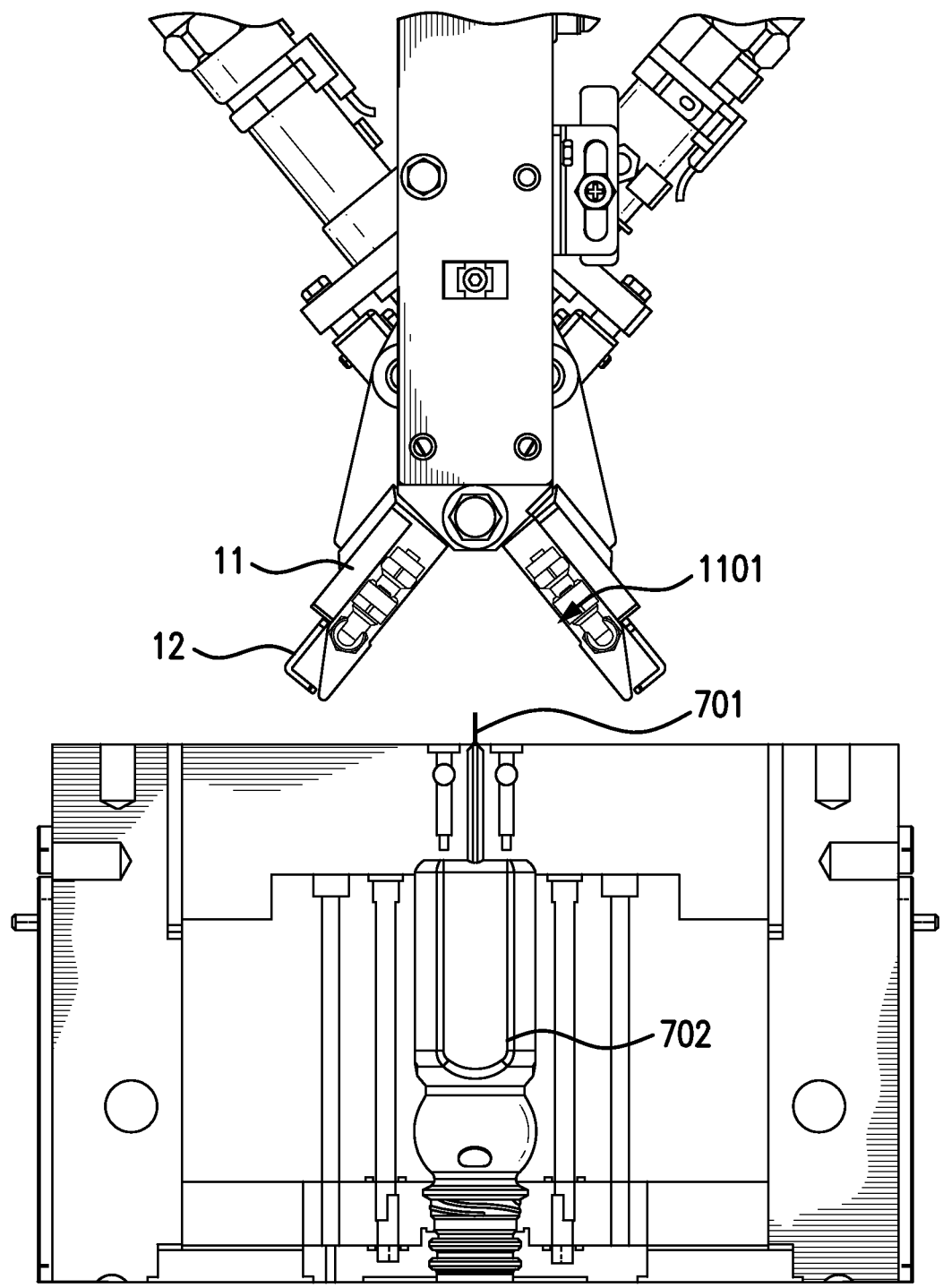
FIG. 6 is a schematic view of a portion of a system including at least one gripping assembly in accordance with the disclosed subject matter.
Figure 7:
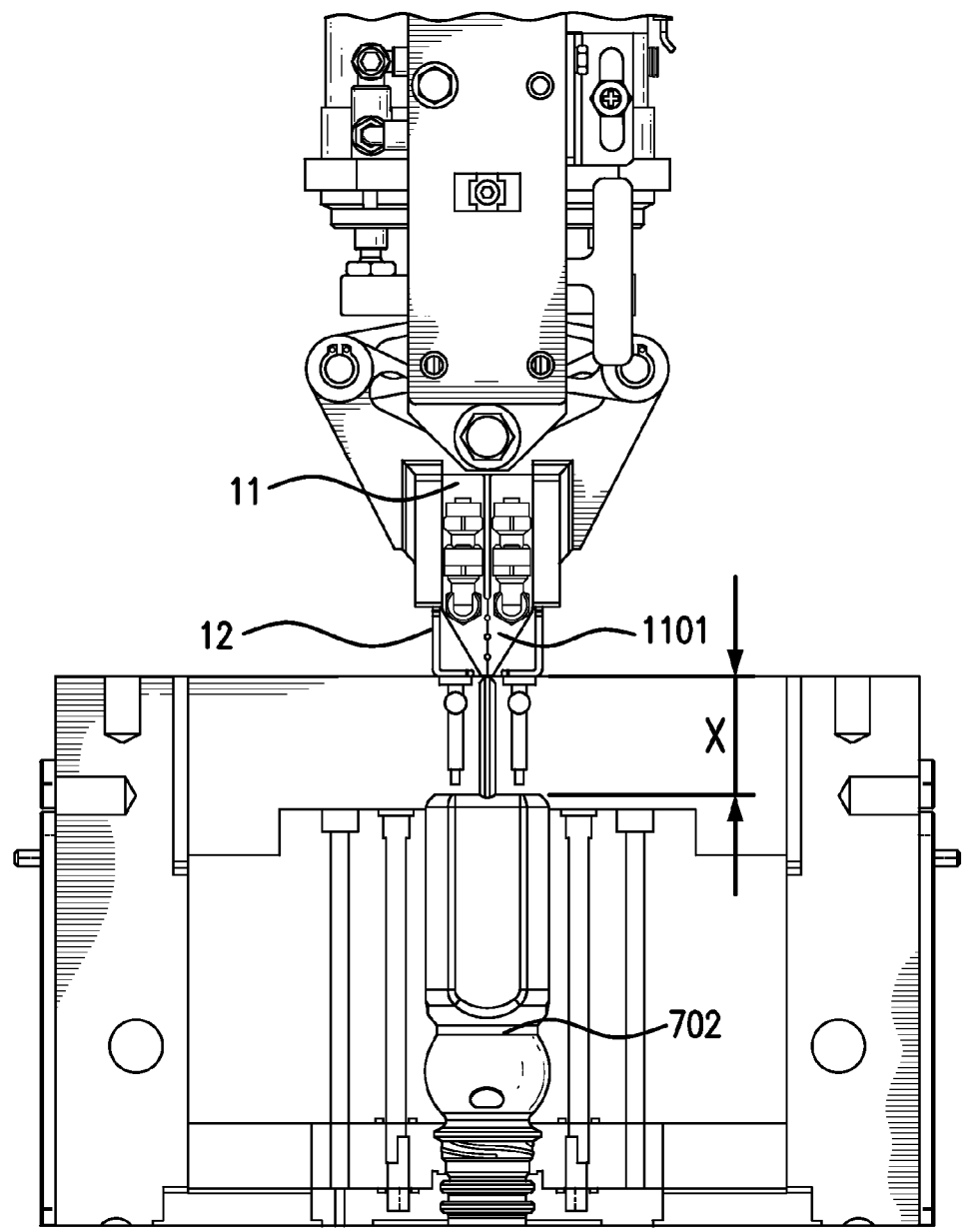
FIG. 7 is a schematic view of a portion of a system including at least one gripping assembly in accordance with the disclosed subject matter.
Figure 8:
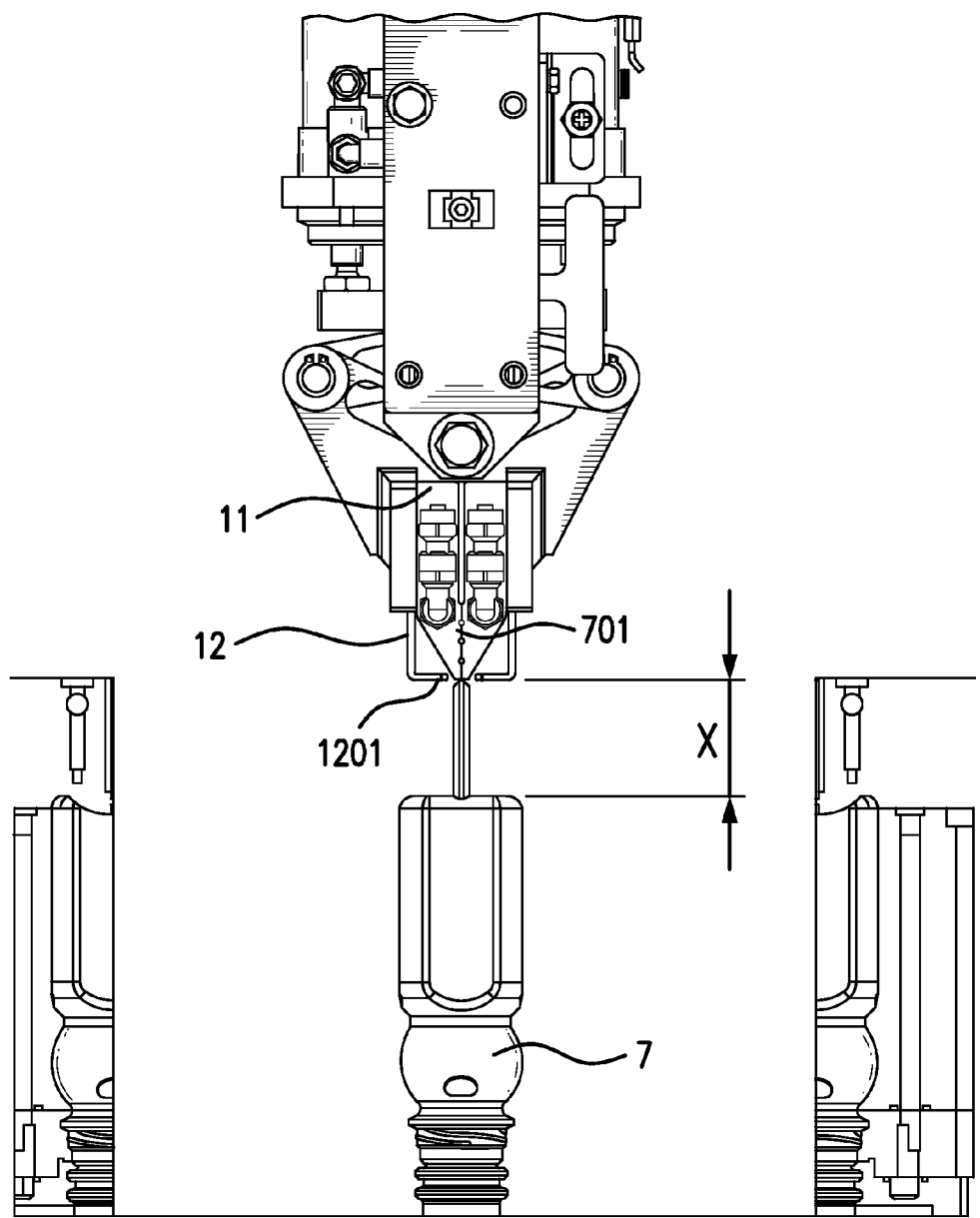
FIG. 8 is a schematic view of a portion of a system including at least one gripping assembly in accordance with the disclosed subject matter.
Figure 9:
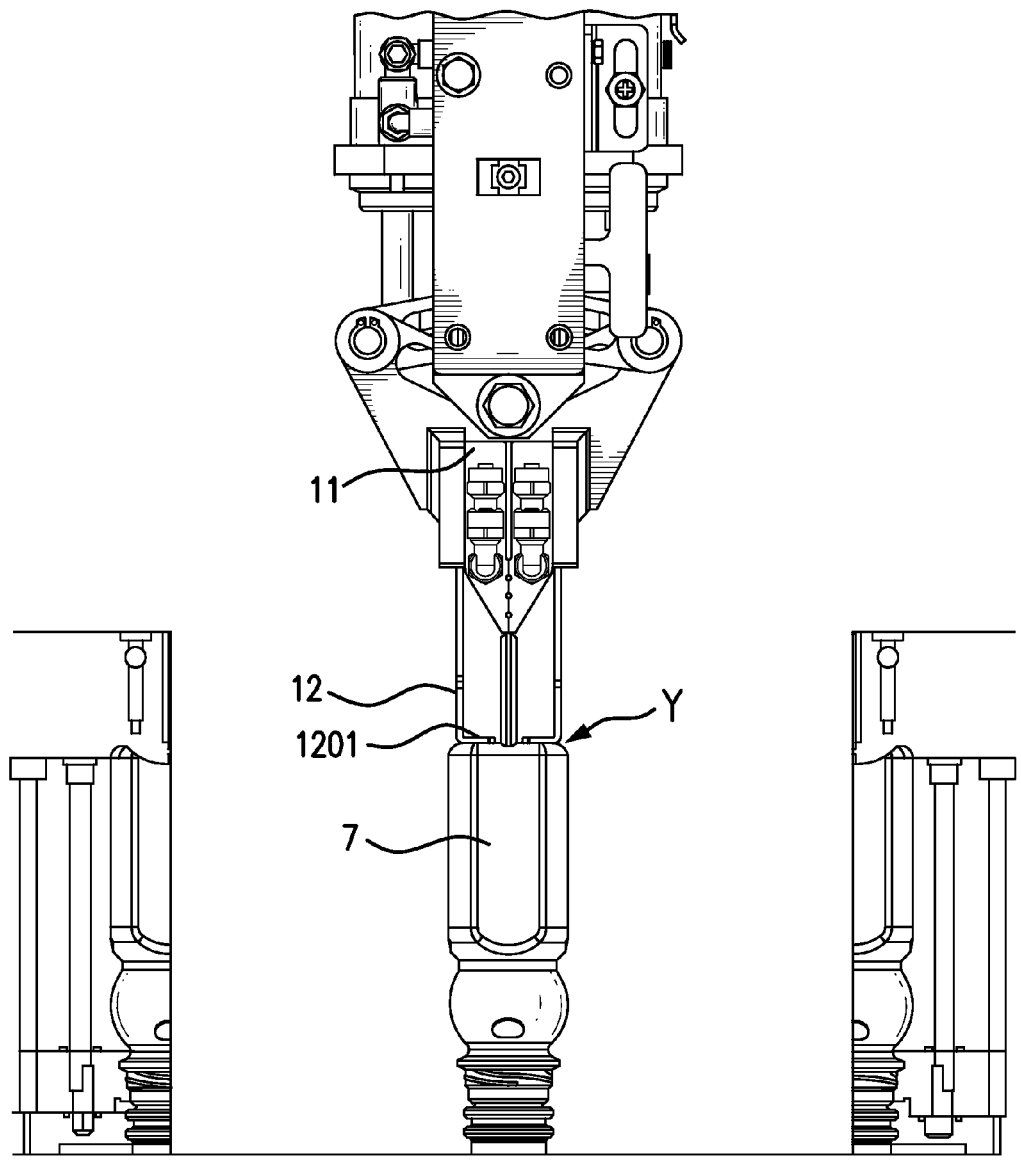
FIG. 9 is a schematic view of a portion of a system including at least one gripping assembly in accordance with the disclosed subject matter.
Figure 10:
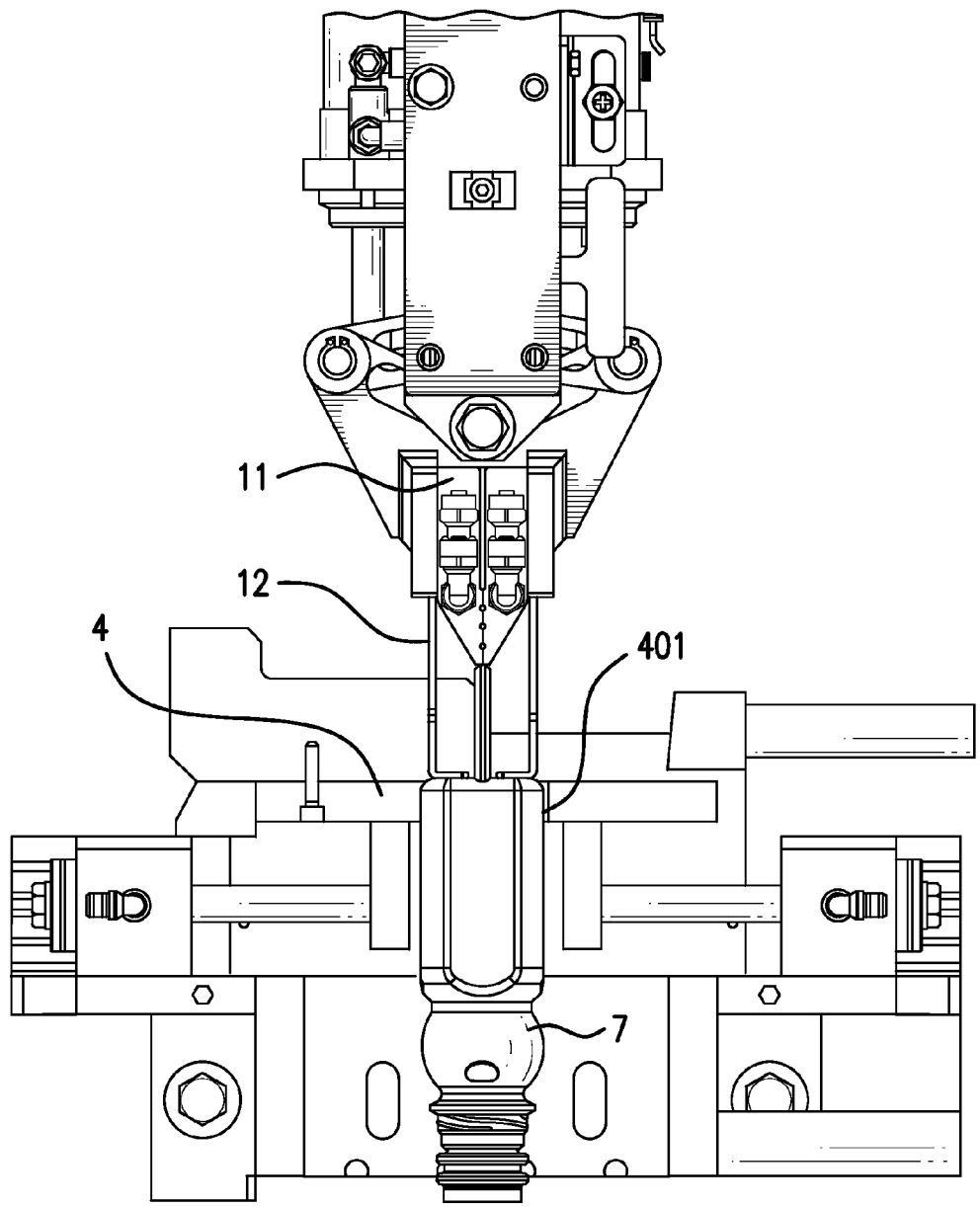
FIG. 10 is a schematic view of a portion of a system including at least one gripping assembly in accordance with the disclosed subject matter.
Figure 11:
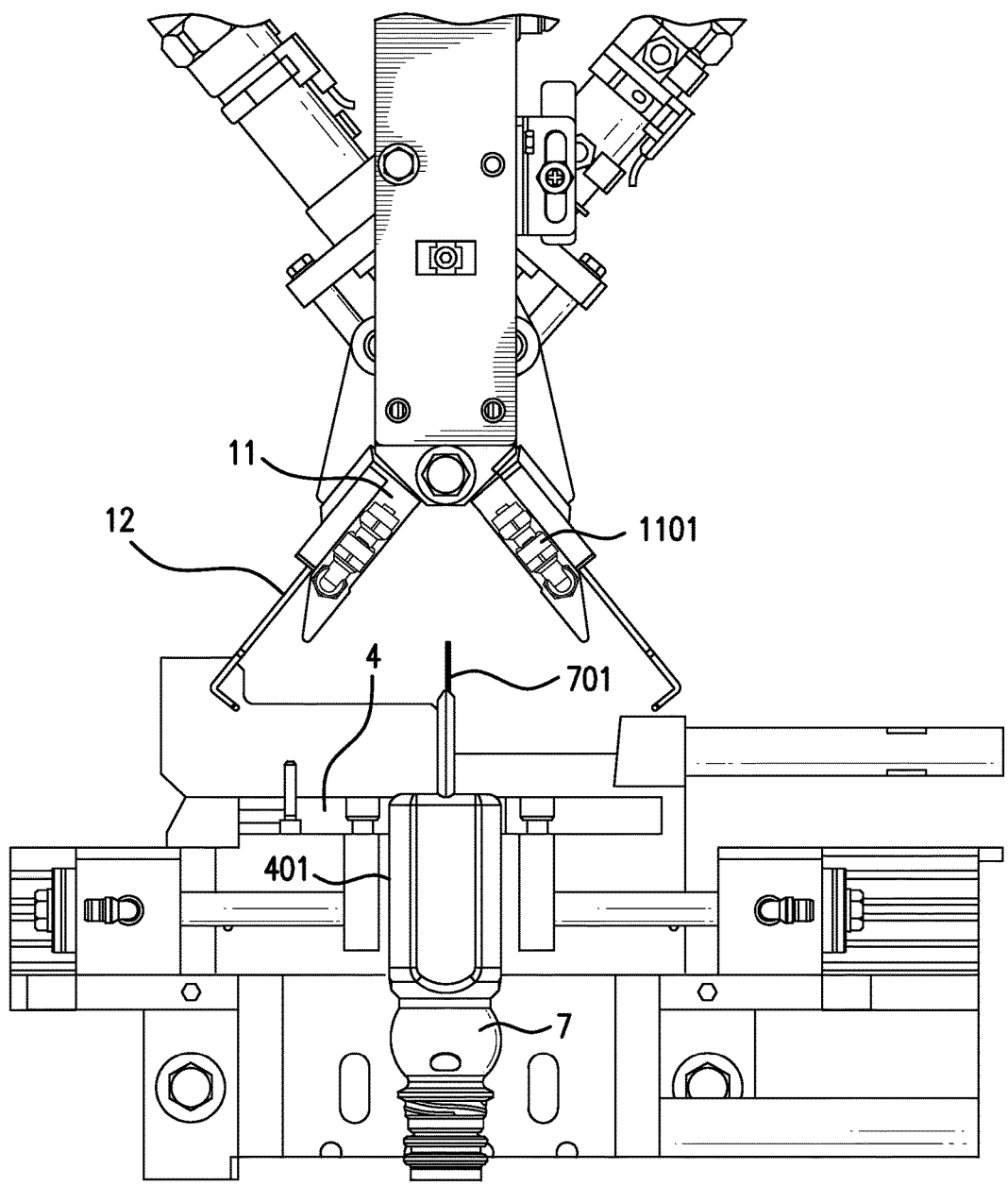
FIG. 11 is a schematic view of a portion of a system including at least one gripping assembly in accordance with the disclosed subject matter.
Figure 12:
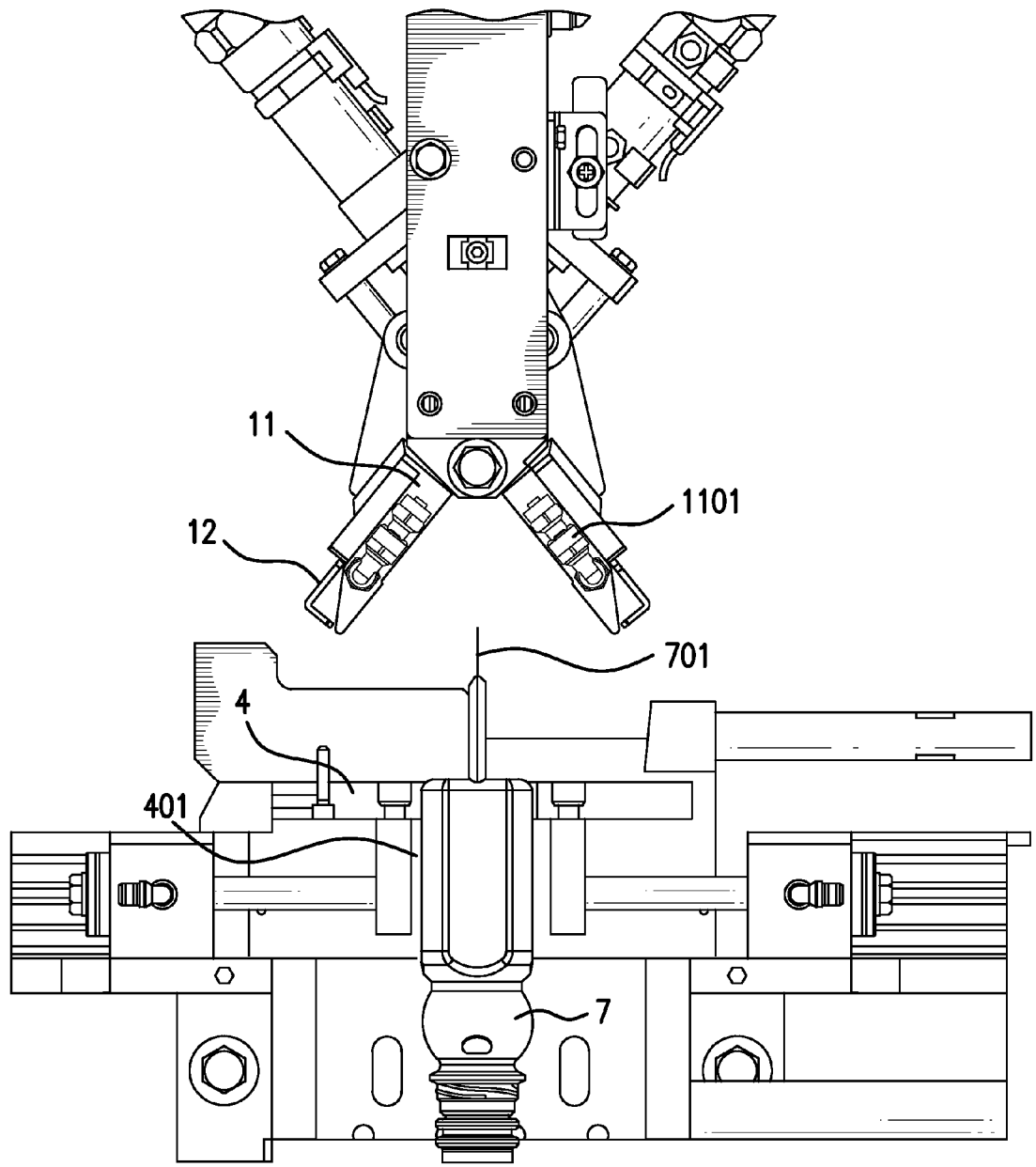
FIG. 12 is a schematic view of a portion of a system including at least one gripping assembly in accordance with the disclosed subject matter.

As embodied herein, at least a first portion 701 of the parison can extend outside the mold assembly 2, for example, as shown in FIG. 6. Additionally, at least a second portion 702 of the parison can be disposed within the mold chamber 201 when the mold assembly 2 is in the closed configuration.

For purpose of illustration and not limitation, the gripping assembly 1 can include a gripper 11 to close on the first portion 701 of the parison and open to release the first portion 701 of the parison. A stabilization member 12 can extend proximate the gripper 11 to engage a surface of at least one container body 7 formed by blow-molding second portion 702 of the parison and to retract from engagement with the surface of the container body 7. As embodied herein, a frame 19 can connect the gripping assembly and the mold assembly.

For purpose of illustration and not limitation, the stabilization member 12 can extend and retract by a drive assembly selected from a mechanical drive, a hydraulic drive, or a pneumatic drive. For example, at least one column 23 can extend from the gripper 11. A carriage 22 can be mounted on the at least one column, the carriage carrying the stabilization member 12. At least one drive cylinder 21 can be connected to the carriage 22. The drive cylinder 21 can move the carriage 22 along the column 23 to thereby extend and retract the stabilization member 12. For purpose of example and not limitation, the drive cylinder 21 can be integral with the carriage 22. As embodied herein, the drive cylinder 21 can be a pneumatic cylinder.

Additionally, an adjusting device 24 can adjust a working stroke Z of the drive cylinder 21. For example, the adjusting device 24 can be any suitable adjusting device including but not limited to a ring nut. The adjusting device 24 can allow correcting of the positioning of the stabilization member 12 with respect to the container body 7 by adjusting the working stroke Z of the drive cylinder 21. Additionally or alternatively, a valve block 25 can prevent the stabilization member 12 from extending if the at least one drive cylinder is not operational (e.g. if a pneumatic drive cylinder 21 lacks air).

For purpose of illustration and not limitation, the stabilization member 12 can be an L shaped member with an engagement leg 1201. As embodied herein, a second stabilization member 12 can extend proximate the gripper 11 to engage a second surface of the at least one container body 7 and to retract from engagement with the second surface of the at least one container body 7.

Figure 13:
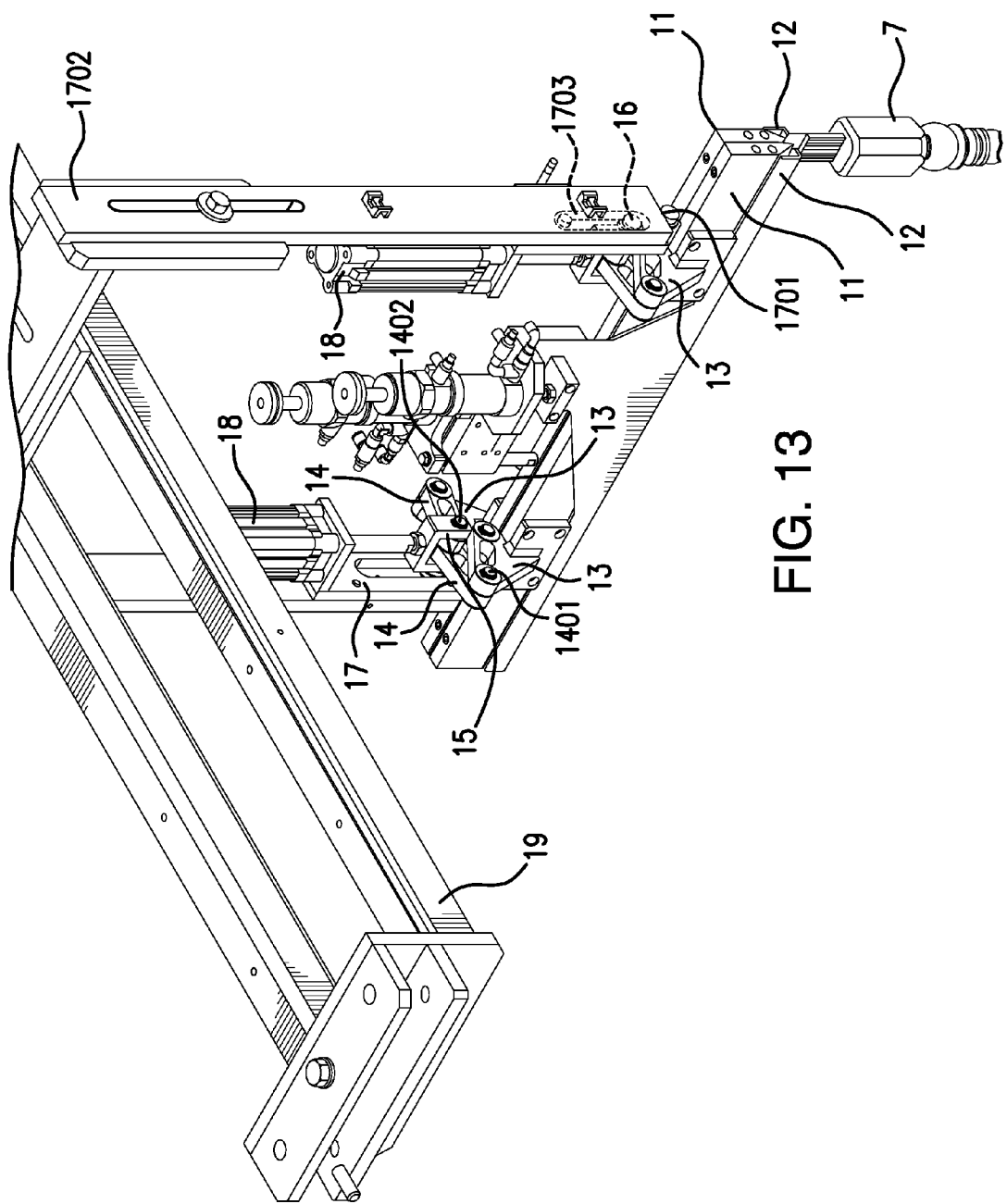
FIG. 13 is a schematic view of a portion of a system including at least one gripping assembly in accordance with the disclosed subject matter.
Figure 14:
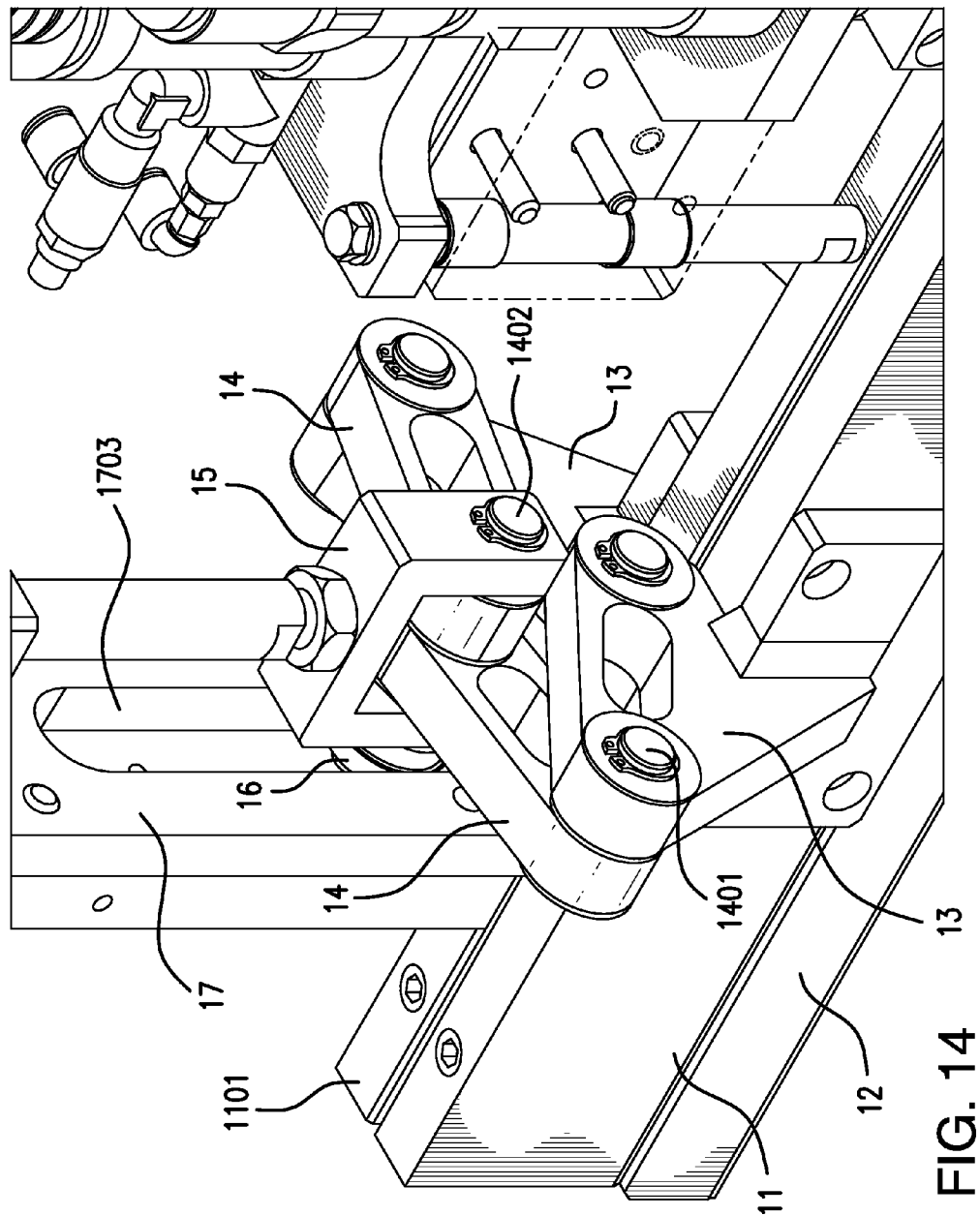
FIG. 14 is a schematic view of a portion of a gripping assembly in accordance with the disclosed subject matter.
Figure 15:
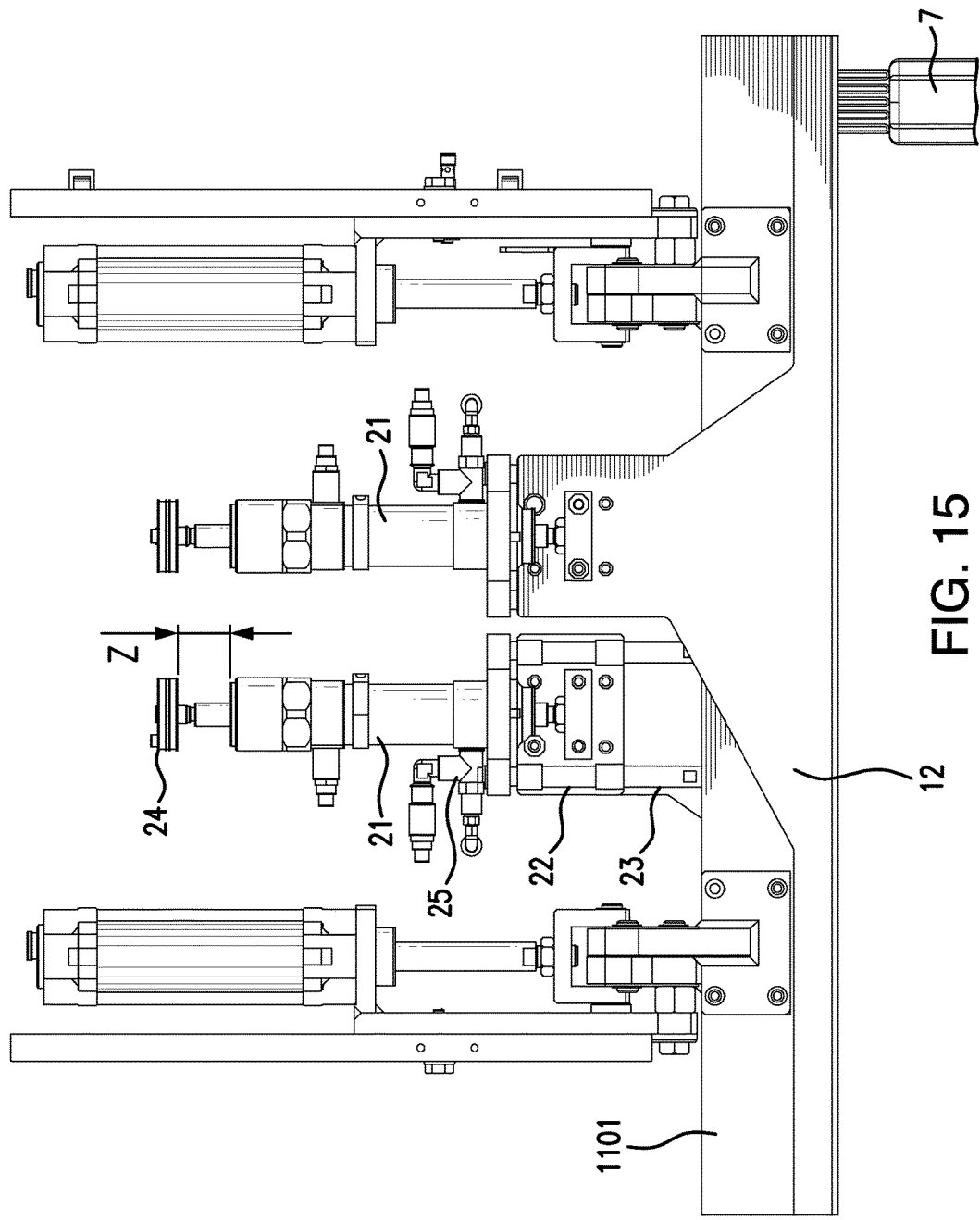
FIG. 15 is a schematic view of a gripping assembly in accordance with the disclosed subject matter.

For example and not limitation, the gripper 11 can close and open by at least one drive assembly selected from a mechanical drive, a hydraulic drive, or a pneumatic drive. For purpose of illustration, the gripper 11 can include at least two gripper paddles 1101. A first support 13 can be connected to each gripper paddle 1101. Additionally or alternatively, the first support 13 can be integral with the gripper paddle 1101. Connecting rods 14 each can have a first connection point 1401 and a second connection point 1402. The first connection point 1401 can be connected to a respective first support 13. At least one second support 15 can be connected to the second connection point 1402 of the connecting rods 14 opposite the first support 13. Additionally, as shown in FIGS. 13-14, the connecting rods 14 can form at least one parallelogram.

As embodied herein, at least one third support 17 can have a first end 1701, a second end 1702, and a track 1703 disposed between the first end 1701 and the second end 1702. Additionally, a wheel 16 can be disposed in the track 1703 of the third support 17. The wheel 16 can move within the track 1703, and the wheel 16 can be connected to the second support member 15. For purpose of illustration and not limitation, at least one drive assembly 18 selected from a mechanical drive, a hydraulic drive, or a pneumatic drive can be connected between the second support member 15 and the third support member 17. The drive assembly 18 can move the second support member 15 to thereby open and close the gripper paddles 1101. For example and not limitation, the drive assembly 18 can be a pneumatic cylinder that can move the second support member 15 downward to compress the parallelogram of the connecting rods 14, thereby rotating the gripper paddles 1101 into the closed position. Likewise, the drive assembly 18 can move the second support member 15 upward to extend the parallelogram of the connecting rods 14, thereby rotating the gripper paddles 1101 into the open position. The wheel 16 in the track 1703 can help ensure appropriate vertical movement by the second support member 15.

For example and not limitation, the system can further include a trimming station 4 adjacent to the mold assembly 2. The trimming station 4 can include a container socket 401 adapted to receive the container 7. Additionally, a trimmer (not pictured) can trim scrap material 703 from the at least one container body 7. The scrap material 703 can include the first portion 701 of the parison. For purpose of illustration and not limitation, the trimmer can include any suitable technique for trimming including but not limited to a mechanical trimmer, such as a blade, a set of blades, or a hot wire.

As embodied herein, the gripping assembly can move the container body 7 from the mold assembly 2 to the trimming station 4. Additionally or alternatively, an output gripper 5 can transport the container body 7 from the trimming station 4.

For purpose of illustration and not limitation, the system can include an extruder 6 to extrude the at least one parison into the mold assembly 2. For example, the parison could be formed from materials including, but not limited to, polyethylene terephthalate (PET), polyethylene naphthalate (PEN) and PEN-blends, polypropylene (PP), high-density polyethylene (HDPE), and post consumer resin (PCR), and can also include monolayer blended scavengers or other catalytic scavengers as well as multi-layer structures including discrete layers of a barrier material, such as nylon or ethylene vinyl alcohol (EVOH) or other oxygen scavengers.

For purpose of illustration and not limitation, reference is made to the exemplary embodiment of the more detailed method as depicted in FIGS. 16-17, with reference to FIGS. 1-15. As embodied herein, the method to manufacture at least one container can employ the system and gripping assembly 11 described above. Generally, at least one parison is disposed within a mold assembly 2 having at least one mold chamber 201 defined therein, wherein at least a first portion 701 of the parison extends outside the mold assembly 2 and at least a second portion 702 of the parison is disposed within the at least one mold chamber 201 (1601). The mold assembly 2 can be closed (1602).

The second portion 702 of the at least one parison can be blow-molded to form at least one container body 7 (1603). For example and not limitation, each mold chamber 201 can include one or more blow needles to form the hollow container body 7 by blow-molding. Alternatively, the container body 7 can be formed by mechanical group blowing, which can include inserting at least one nozzle into the mold chamber 201 through the openings of a neck formed in the mold chamber 201. Additionally, when the parison is enclosed in the mold assembly 2, the gripper 11 can be open and the stabilization member 12 can be retracted (see, e.g., FIG. 6).

The first portion 701 of the at least one parison can be gripped (1604). For example and not limitation, the gripper 11 can close to grip the first portion 701 of the parison, thereby supporting the container body 7. Additionally or alternatively, the first portion 701 of the parison can be part of the scrap material 703 that can be removed as described herein. For purpose of illustration and not limitation, the gripper 11 can close to grip the first portion of the parison 701 (1604) before, after, or simultaneously with the blow-molding of the container body 7 (1603).

As embodied herein, the mold assembly 2 can be opened (1605). At least one stabilization member 12 can be extended proximate to the gripper 11 to engage a surface of the at least one container body 7 (1606). For example, the stabilization member 12 can extend the distance X to engage the surface of container bodies 7 (see, e.g., FIG. 8). For example and not limitation, the extended stabilization member 12 can rest on a bottom surface Y of the container 7 (see, e.g., FIG. 9).

For purpose of illustration and not limitation, the container body 7 can be moved with the gripper 11 (1707). The stabilization member 12 can engage the container body 7 during the moving phase. For example, after the mold assembly 2 is opened (1605) the stabilization member 12 can be extended to engage the container body 7 (1606) during the movement of the container body 7 from the mold assembly 2 to the trimming station 4 (1707). Accordingly, the stabilization member 12 can engage the container body 12 during and after the opening phase A of the mold assembly 2. For purpose of illustration, the stabilization member 12 can engage the container body 7 to prevent oscillation of the container body 7 after the opening of the mold assembly 2.

Additionally or alternatively, a container socket 401 can be closed on the container body 7 (1708). For example and not limitation, avoiding the oscillation of the container bodies 7 as described herein can enhance the functionality of the system and/or the trimming station 4, which can tighten the container socket 401 around the containers 7 more quickly since the stabilization member 12 engage the container body 7 and prevent it from oscillating, thus reducing waiting times.

As embodied herein, the first portion 701 of the parison can be released from the gripper 11 with the container socket 401 closed on the at least one container body 7 (1709). For example and not limitation, the stabilization member 12 can be retracted from the surface of the at least one container body 7 with the container socket 401 closed on the at least one container body 7 (1710). For purpose of illustration and not limitation, the stabilization member 12 can be retracted (1710) before, after, or simultaneously with the releasing of the first portion 701 of the parison (1709). Additionally or alternatively, the retraction of the stabilization member 12 (1710) and/or the releasing of the first portion 701 of the parison (1709) can be before, after, or simultaneous with the closing of the container socket 401 on the container body 7 (1708). As embodied herein, scrap material 703 can be trimmed from the at least one container body 7 (1711). After the scrap material 703 is removed from the container 7, the output gripper 5 can transport the containers 7 away.

For purpose of illustration and not limitation, the stabilization member 12 can be an L shaped member with an engagement leg 1201. Additionally or alternatively, the stabilization member 12 can be mounted to the gripper 11. As embodied herein, a second stabilization member 12 can engage a second surface of the at least one container body 7.

For example and not limitation, extending (1606) can be performed by a drive cylinder.

In addition to the specific embodiments claimed below, the disclosed subject matter is also directed to other embodiments having any other possible combination of the dependent features claimed below and those disclosed above. As such, the particular features disclosed herein can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A method to manufacture at least one container, comprising:
   disposing at least one parison within a mold assembly having at least one mold chamber defined therein, wherein at least a first portion of the at least one parison extends outside the mold assembly and at least a second portion of the at least one parison is disposed within the at least one mold chamber;
   closing the mold assembly;
   blow-molding the second portion of the at least one parison to form at least one container body;
   gripping the first portion of the at least one parison with a gripper;
   opening the mold assembly; and
   extending a stabilization member proximate to the gripper to engage a surface of the at least one container body, wherein extending is performed by a drive assembly selected from at least one of a drive cylinder, a mechanical drive, a hydraulic drive, or a pneumatic drive.

2. The method of claim 1, further comprising moving the at least one container body with the gripper.

3. The method of claim 1, further comprising closing a container socket on the at least one container body.

4. The method of claim 3, further comprising releasing the first portion of the at least one parison from the gripper with the container socket closed on the at least one container body.

5. The method of claim 4, further comprising retracting the stabilization member from the surface of the at least one container body with the container socket closed on the at least one container body.

6. The method of claim 5, further comprising trimming scrap material from the at least one container body.

7. The method of claim 1, further comprising a second stabilization member to engage a second surface of the at least one container body.

8. The method of claim 1, wherein the stabilization member is mounted to the gripper.

9. The method of claim 1, wherein the stabilization member comprises an L shaped member with an engagement leg.

10. A gripping assembly to support at least one container comprising:
    a gripper adapted to close on at least a first portion of at least one parison and open to release the first portion of the at least one parison; and
    a stabilization member adapted to extend proximate the gripper to engage a surface of at least one container body formed by blow-molding at least a second portion of the at least one parison and to retract from engagement with the surface of the at least one container body, wherein the stabilization member is adapted to extend and retract by a drive assembly selected from at least one of a drive cylinder, a mechanical drive, a hydraulic drive, or a pneumatic drive.

11. The gripping assembly of claim 10, further comprising:
    at least one column extending from the gripper; and
    a carriage mounted on the at least one column, the carriage carrying the stabilization member.

12. The gripping assembly of claim 11, wherein the drive assembly comprises at least one drive cylinder connected to the carriage, the at least one drive cylinder adapted to move the carriage along the column to thereby extend and retract the stabilization member.

13. The gripping assembly of claim 12, further comprising an adjusting device for adjusting a working stroke of the at least one drive cylinder.

14. The gripping assembly of claim 12, further comprising a valve block to prevent the stabilization member from extending if the at least one drive cylinder is not operational.

15. The gripping assembly of claim 10, further comprising a second stabilization member adapted to extend proximate the gripper to engage a second surface of the at least one container body and to retract from engagement with the second surface of the at least one container body.

16. The gripping assembly of claim 10, wherein the stabilization member comprises an L shaped member with an engagement leg.

17. The gripping assembly of claim 10, wherein the gripper comprises at least two gripper paddles, the gripper further comprising:
    a first support connected to each gripper paddle;
    connecting rods each having a first connection point and a second connection point, the first connection point connected to a respective first support;
    at least one second support connected to the second connection point of the connecting rods opposite the first supports;
    at least one third support having a first end, a second end, and a track disposed between the first end and the second end; and
    a wheel disposed in the track of the at least one third support and adapted to move within the track, the wheel being connected to the at least one second support member.

18. The gripping assembly of claim 17, further comprising at least one second drive assembly selected from a mechanical drive, a hydraulic drive, or a pneumatic drive connected between the at least one second support member and the at least one third support member, the at least one second drive assembly adapted to move the at least one second support member to thereby open and close the gripper paddles.

19. A system to manufacture at least one container, comprising:
    a mold assembly having an open configuration and a closed configuration and having at least one mold chamber defined therein, the mold assembly adapted to receive at least one parison, wherein at least a first portion of the at least one parison extends outside the mold assembly and at least a second portion of the at least one parison is disposed within the at least one mold chamber when the mold assembly is in the closed configuration;

at least one gripping assembly, comprising:
  a gripper adapted to close on the first portion of the at least one parison and open to release the first portion of the at least one parison, and
  a stabilization member adapted to extend proximate the gripper to engage a surface of at least one container body formed by blow-molding the second portion of the at least one parison and to retract from engagement with the surface of the at least one container body; and
a frame connecting the gripping assembly and the mold assembly,
wherein the stabilization member is adapted to extend and retract by a drive assembly selected from at least one of a drive cylinder, a mechanical drive, a hydraulic drive, or a pneumatic drive.

20. The system of claim 19, wherein the gripping assembly further comprises:
at least one column extending from the gripper; and
a carriage mounted on the at least one column, the carriage carrying the stabilization member.

21. The system of claim 20, wherein the drive assembly comprises at least one drive cylinder connected to the carriage, the at least one drive cylinder adapted to move the carriage along the column to thereby extend and retract the stabilization member.

22. The system of claim 21, wherein the gripping assembly further comprises an adjusting device for adjusting a working stroke of the at least one drive cylinder.

23. The system of claim 21, wherein the gripping assembly further comprises a valve block to prevent the stabilization member from extending if the at least one drive cylinder is not operational.

24. The gripping assembly of claim 19, further comprising a second stabilization member adapted to extend proximate the gripper to engage a second surface of the at least one container body and to retract from engagement with the second surface of the at least one container body.

25. The gripping assembly of claim 19, wherein the stabilization member comprises an L shaped member with an engagement leg.

26. The system of claim 19, wherein the gripper comprises at least two gripper paddles, and wherein the gripping assembly further comprises:
a first support connected to each gripper paddle;
connecting rods each having a first connection point and a second connection point, the first connection point connected to a respective first support; at least one second support connected to the second connection point of the connecting rods opposite the first supports;
at least one third support having a first end, a second end, and a track disposed between the first end and the second end;
a wheel disposed in the track of the at least one third support and adapted to move within the track, the wheel being connected to the at least one second support member; and
at least one second drive assembly selected from a mechanical drive, a hydraulic drive, or a pneumatic drive connected between the at least one second support member and the at least one third support member, the at least one second drive assembly adapted to move the at least one second support member to thereby open and close the gripper paddles.

27. The system of claim 19, further comprising at least one trimming station adjacent to the mold assembly, wherein the trimming station comprises:
container sockets adapted to receive the at least one container body; and
a trimmer adapted to trim scrap material from the at least one container body.

28. The system of claim 27, wherein the gripping assembly is adapted to move the at least one container body from the mold assembly to the trimming station.

29. The system of claim 27, further comprising an output gripper to transport the at least one container body from the trimming station.

30. The system of claim 19, further comprising an extruder to extrude the at least one parison into the mold assembly.

31. A method to manufacture at least one container, comprising:
disposing at least one parison within a mold assembly having at least one mold chamber defined therein, wherein at least a first portion of the at least one parison extends outside the mold assembly and at least a second portion of the at least one parison is disposed within the at least one mold chamber;
closing the mold assembly;
blow-molding the second portion of the at least one parison to form at least one container body;
gripping the first portion of the at least one parison with a gripper;
opening the mold assembly; and
extending a stabilization member proximate to the gripper to engage a surface of the at least one container body, wherein the stabilization member comprises an L shaped member with an engagement leg.

32. A gripping assembly to support at least one container comprising:
a gripper adapted to close on at least a first portion of at least one parison and open to release the first portion of the at least one parison; and
a stabilization member adapted to extend proximate the gripper to engage a surface of at least one container body formed by blow-molding at least a second portion of the at least one parison and to retract from engagement with the surface of the at least one container body, wherein the stabilization member comprises an L shaped member with an engagement leg.

33. A system to manufacture at least one container, comprising:
a mold assembly having an open configuration and a closed configuration and having at least one mold chamber defined therein, the mold assembly adapted to receive at least one parison, wherein at least a first portion of the at least one parison extends outside the mold assembly and at least a second portion of the at least one parison is disposed within the at least one mold chamber when the mold assembly is in the closed configuration;
at least one gripping assembly, comprising:
  a gripper adapted to close on the first portion of the at least one parison and open to release the first portion of the at least one parison, and
  a stabilization member adapted to extend proximate the gripper to engage a surface of at least one container body formed by blow-molding the second portion of the at least one parison and to retract from engagement with the surface of the at least one container body; and
a frame connecting the gripping assembly and the mold assembly,
wherein the stabilization member comprises an L shaped member with an engagement leg.

* * * * *